United States Patent
Avegliano et al.

(10) Patent No.: US 11,687,620 B2
(45) Date of Patent: Jun. 27, 2023

(54) ARTIFICIAL INTELLIGENCE GENERATED SYNTHETIC IMAGE DATA FOR USE WITH MACHINE LANGUAGE MODELS

(71) Applicant: International Business Machines Corporation, Armonk, NY (US)

(72) Inventors: Priscilla Barreira Avegliano, Sao Paulo (BR); Andrea Britto Mattos Lima, Sao Paulo (BR); Marisa Affonso Vasconcelos, Sao Paulo (BR); Dario Augusto Borges Oliveira, Paraíso (BR)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 17/125,880

(22) Filed: Dec. 17, 2020

(65) Prior Publication Data
US 2022/0198221 A1 Jun. 23, 2022

(51) Int. Cl.
G06N 20/00 (2019.01)
G06F 18/214 (2023.01)
(Continued)

(52) U.S. Cl.
CPC ......... G06F 18/2148 (2023.01); G06N 3/045 (2023.01); G06N 20/00 (2019.01); G06T 3/0012 (2013.01); G06V 20/188 (2022.01)

(58) Field of Classification Search
CPC .... G06F 18/2148; G06N 20/00; G06N 3/045; G06V 20/188; G06T 3/0012
See application file for complete search history.

(56) References Cited

U.S. PATENT DOCUMENTS

| 5,652,851 A | 7/1997 | Stone |
| 8,020,104 B2 | 9/2011 | Robarts |
| (Continued) | | |

FOREIGN PATENT DOCUMENTS

| CN | 105740991 A | 7/2016 |
| DE | 1020190025061 A1 | 11/2019 |
| (Continued) | | |

OTHER PUBLICATIONS

"Context-Aware Switching of Input Systems", An IP.com Prior Art Database Technical Disclosure, Disclosed Anonymously, IP.com No. IPCOM000252361D, IP.com Electronic Publication Date: Jan. 5, 2018, 39 pages.
(Continued)

*Primary Examiner* — Manav Seth
(74) *Attorney, Agent, or Firm* — Michael A. Petrocelli

(57) ABSTRACT

A computer completes a data image analysis task. The computer receives a machine learning (ML) model trained for use with image data content characterized by first context. The computer receives an evaluation image dataset having evaluation image data content characterized by a second context. The computer receives a request to complete an image data analysis task for the evaluation image dataset using the ML model. The computer compares the contexts to determine whether the contexts are similar and whether the evaluation image dataset is compatible with the ML model. If the evaluation dataset is incompatible with the ML model, the computer uses the generative model to generate a ML model compatible synthetic image dataset based on the evaluation dataset. The computer applies the ML model to
(Continued)

the synthetic image dataset to provide an answer for the data image analysis task; the computer delivers the answer to a user interface.

20 Claims, 9 Drawing Sheets

(51) Int. Cl.
*G06T 3/00* (2006.01)
*G06V 20/10* (2022.01)
*G06N 3/045* (2023.01)

(56) References Cited

U.S. PATENT DOCUMENTS

| | | | |
|---|---|---|---|
| 8,345,057 B2* | 1/2013 | Ptucha | G06T 11/60 382/209 |
| 8,849,853 B2* | 9/2014 | Ptucha | G06T 11/60 707/805 |
| 10,255,517 B2 | 4/2019 | Uchiyama | |
| 10,521,863 B2 | 12/2019 | Stoner, Jr. | |
| 10,643,368 B2 | 5/2020 | Yu | |
| 10,943,377 B2* | 3/2021 | Ranzinger | G06V 10/761 |
| 11,601,423 B2* | 3/2023 | Bud | H04W 12/06 |
| 2013/0011070 A1* | 1/2013 | Datta | G06V 10/766 382/195 |
| 2017/0132497 A1* | 5/2017 | Santos | G06N 3/042 |
| 2017/0132537 A1* | 5/2017 | Chavez | G06Q 40/06 |
| 2018/0144214 A1* | 5/2018 | Hsieh | G06T 7/0002 |
| 2018/0197087 A1* | 7/2018 | Luo | G06F 16/285 |
| 2018/0240257 A1* | 8/2018 | Li | G06V 10/774 |
| 2018/0336467 A1 | 11/2018 | Guttmann | |
| 2019/0026608 A1* | 1/2019 | Hsieh | G06N 3/084 |
| 2019/0179009 A1* | 6/2019 | Klein | G01S 13/9023 |
| 2019/0325269 A1* | 10/2019 | Bagherinezhad | G06F 18/241 |
| 2020/0012900 A1 | 1/2020 | Walters | |
| 2020/0125929 A1* | 4/2020 | Guo | G06N 3/045 |
| 2020/0126232 A1* | 4/2020 | Guo | G06T 5/50 |
| 2020/0184153 A1* | 6/2020 | Bongartz | A01G 9/249 |
| 2020/0257587 A1* | 8/2020 | Chau | G06F 11/0769 |
| 2020/0327375 A1* | 10/2020 | Naveh | G06T 7/70 |
| 2021/0012246 A1* | 1/2021 | Hazard | G06N 7/01 |
| 2021/0019343 A1* | 1/2021 | Singh | G06N 3/04 |
| 2021/0073267 A1* | 3/2021 | Chopra | G06F 16/535 |
| 2021/0110554 A1* | 4/2021 | Rivard | G06N 3/08 |
| 2022/0215243 A1* | 7/2022 | Narayanaswami | G06F 18/2193 |

FOREIGN PATENT DOCUMENTS

| | | |
|---|---|---|
| EP | 35915861 A1 | 1/2020 |
| KR | 20200004777 A | 1/2020 |
| WO | 2015148887 A1 | 10/2015 |
| WO | 2019211089 A1 | 11/2019 |

OTHER PUBLICATIONS

"Defining predictive model based on process mining approach in Weather Forecasting", An IP.com Prior Art Database Technical Disclosure, Disclosed Anonymously, IP.com No. IPCOM000256774D, IP.com Electronic Publication Date: Dec. 29, 2018, 6 pages.

"System and Method for Comprehension and Inference of DL Model from Image Sources", An IP.com Prior Art Database Technical Disclosure, Disclosed Anonymously, IP.com No. IPCOM000254732D, IP.com Electronic Publication Date: Jul. 26, 2018, 8 pages.

Chenu, et al., "The contribution of agroforestry systems to climate change mitigation—Assessment of C storage in soils in a Mediterreanean context", International scientific and professional conference, Our common future under climate change, Jul. 2015, 859 pages.

Flato, et al., "Evaluation of Climate Models: Chapter 9", In: Climate Change 2013: The Physical Science Basis. Contribution of Working Group I to the Fifth Assessment Report of the Intergovernmental Panel on Climate Change, 2013, Cambridge University Press, pp. 741-866.

Mell, et al., "The NIST Definition of Cloud Computing", National Institute of Standards and Technology, Special Publication 800-145, Sep. 2011, 7 pages.

Rolnick, et al., "Tackling Climate Change with Machine Learning", arXiv:1906.05433v2, Nov. 5, 2019, 111 pages.

* cited by examiner

ARTIFICIAL INTELLIGENCE GENERATED SYNTHETIC IMAGE DATA FOR USE WITH MACHINE LANGUAGE MODELS

BACKGROUND

The present invention relates generally to the field of Artificial Intelligence (AI), and more specifically, to the application of Machine Learning (ML) techniques for broadening the applicability of recorded data.

Some aspects of the sub-genre within AI known as machine learning can use annotated training data that indicate relationships within the data to train models that are able to provide answers to data-driven inquiries when presented with data similar to the training data during future evaluation. Machine learning has demonstrated great potential to solve agricultural tasks automatically with high efficiency. For instance, the use of aerial images (acquired, e.g., via satellites or unmanned aerial vehicles) combined with computer vision approaches is being used successfully for several tasks, such as crop identification, tree counting, land cover segmentation, among others. Most of these approaches employ data-driven models (e.g., using neural networks trained with previously annotated images). Unfortunately, if a single model previously trained with images associated with a given context (e.g., characterized by attributes from a certain region, period of the year, climate, or other relevant circumstances) is applied to data from a different context (e.g., associated with a different context), the results can be disappointing. Such approaches are not typically able to accurately perform data analysis tasks when using data with formats (e.g., characterized by different conditions) that differ from the data used to train an associated machine learning data analysis model. Data context (e.g., the circumstances associated with data when collected), affects the relevance and applicability of data across different scenarios. Machine learning models trained using data from one context may not be accurate if applied to data (e.g., evaluation or testing data) obtained in a different context.

SUMMARY

According to one embodiment of the invention, a computer implemented method to complete a task using synthetic image data generated from recorded image data, includes receiving, by a computer from a model source, a machine learning (ML) model trained for use with image data content characterized by a first format. The computer receives from a data source, an evaluation image dataset having evaluation image data content characterized by a second format, the computer receives from a task source, a request to complete an image data analysis task for the evaluation image dataset using said ML model. The computer compares the first format to the second format and determines that the formats are characterized by differences that fall below a similarity threshold and that the evaluation image dataset is incompatible with said ML model. The computer receives a generative model from a model source, the generative model being trained to convert image data from the second format into a format compatible with the ML model. The computer uses the generative model to generate a synthetic image dataset having synthetic image data content equivalent to the content of the evaluation image data content and which is characterized by the format compatible with said ML model. The computer applies the ML model to the synthetic image dataset content to provide an answer for the data image analysis task. The computer delivers the answer to a user interface.

According to an aspect of the invention, the synthetic dataset is annotated with model training labels; and wherein the computer, in response to generating the synthetic dataset, trains the ML model on the synthetic dataset. According to aspects of the invention, the generative model is a domain adaption model selected from list of model types consisting of adversarial-based domain adaptation models, divergence-based domain adaptation models, and reconstruction-based domain adaptation models. According to aspects of the invention, the formats are characterized, at least in part by attributes selected from a list consisting of temperature, ambient luminosity, relative humidity, contemporary rainfall quantity, time of day, cloud cover, soil moisture information, seed information, geographical region, and period of year. According to aspects of the invention, the data image analysis task is selected from a list consisting of crop identification, crop counting, crop quality assessment, and crop yield output estimation. According to aspects of the invention, the machine learning (ML) model is trained to solve data image analysis tasks selected from a list consisting of data content classification, data content segmentation, and data content regression. According to aspects of the invention, the computer receives, from the data source, input image data associated with the second format, an indication of format attributes characterizing the second format, and an identification of format attributes characterizing the format compatible with the ML model. The generative model is trained to convert image data content characterized by the second format into equivalent image data characterized by the format compatible with the ML model, using the input image data and the indications of the format attributes.

According to another embodiment, a system to complete a data image analysis task using synthetic image data generated from evaluation image data, comprises: a computer system comprising a computer readable storage medium having program instructions embodied therewith, the program instructions executable by a computer to cause the computer to: receive, from a model source, a machine learning (ML) model trained for use with image data content characterized by a first format; receive, from a data source, an evaluation image dataset having evaluation image data content characterized by a second format; receive, from a task source, a request to complete an image data analysis task for the evaluation image dataset using said ML model; compare, by said computer, said first format to said second format and determining said formats are characterized by differences that fall below a similarity threshold, whereby said evaluation image dataset is incompatible with said ML model; receive a generative model from a model source, said generative model being trained to convert image data from said second format into a format compatible with said ML model; use the generative model to generate a synthetic image dataset having synthetic image data content equivalent to the content of said evaluation image data content and which is characterized by said format compatible with said ML model; apply the ML model to the synthetic image dataset content to provide an answer for the data image analysis task; deliver the answer to a user interface.

According to another embodiment, a computer program product to complete a task using synthetic image data generated from recorded image data, the computer program product comprising a computer readable storage medium having program instructions embodied therewith, the program instructions executable by a computer to cause the computer to: receive, using the computer, from a model source, a machine learning (ML) model trained for use with image data content characterized by a first format; receive, using the computer, from a data source, an evaluation image dataset having evaluation image data content characterized by a second format; receive, using the computer, from a task source, a request to complete an image data analysis task for the evaluation image dataset using said ML model; compare, using the computer, by said computer, said first format to said second format and determining said formats are characterized by differences that fall below a similarity threshold, whereby said evaluation image dataset is incompatible with said ML model; receive, using the computer, a generative model from a model source, said generative model being trained to convert image data from said second format into a format compatible with said ML model; use, by the computer, the generative model to generate a synthetic image dataset having synthetic image data content equivalent to the content of said evaluation image data content and which is characterized by said format compatible with said ML model; apply, using the computer, the ML model to the synthetic image dataset content to provide an answer for the data image analysis task; deliver, using the computer, the answer to a user interface.

The present disclosure recognizes and addresses the shortcomings and problems associated with using models trained with data obtained in a first context (e.g., associated with a first set of collection circumstances) to solve data tasks using evaluation data obtained in a second context different from the first (e.g., associated with a second set of collection circumstances). Aspects of the invention generate new data (e.g. synthetic images) when a new context is introduced, so machine learning models used can use synthetic data with existing and re-trained models to achieve high accuracy. According to aspects of the invention, although data may be acquired by a single sensor (e.g. satellite images), contextual information may be derived from a range of external sources (e.g., weather forecasting services). Aspects of the invention may be used for model generalization between different contexts (including, e.g., across several regions, for a single region at different times, and for improving multi-sensor data analysis in a given region). This allows usage of data collected in one context to be used with models trained with data obtained in a different context. It is noted that, as used herein, the term "context" refers to situational and circumstantially-relevant attributes (including e.g., various environmental, temporal, and location-based aspects) associated with data when is captured or generated.

When solving environment-based tasks, climate change in a particular area may reshape the visual characteristics of a region over a relatively short period of time. In these situations, a model trained with a certain context, in a particular region may no longer work properly for the same region after a short amount of time, due to visual differences between the training data and test (or evaluation) data. It is also noted that data collected in a certain context (e.g., at a certain time, during particular weather conditions, etc.) may not, without adjustment, be appropriate for use with a model trained on data from a different context (e.g., from a different time, collected during different weather conditions, etc.) However, aspects of the present invention allow evaluation data (or testing data) collected in a situation (or context) different from the situation (or context) relevant to the data upon which existing Machine Learning (ML) models were trained to be adjusted as needed for use with the pretrained ML models.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
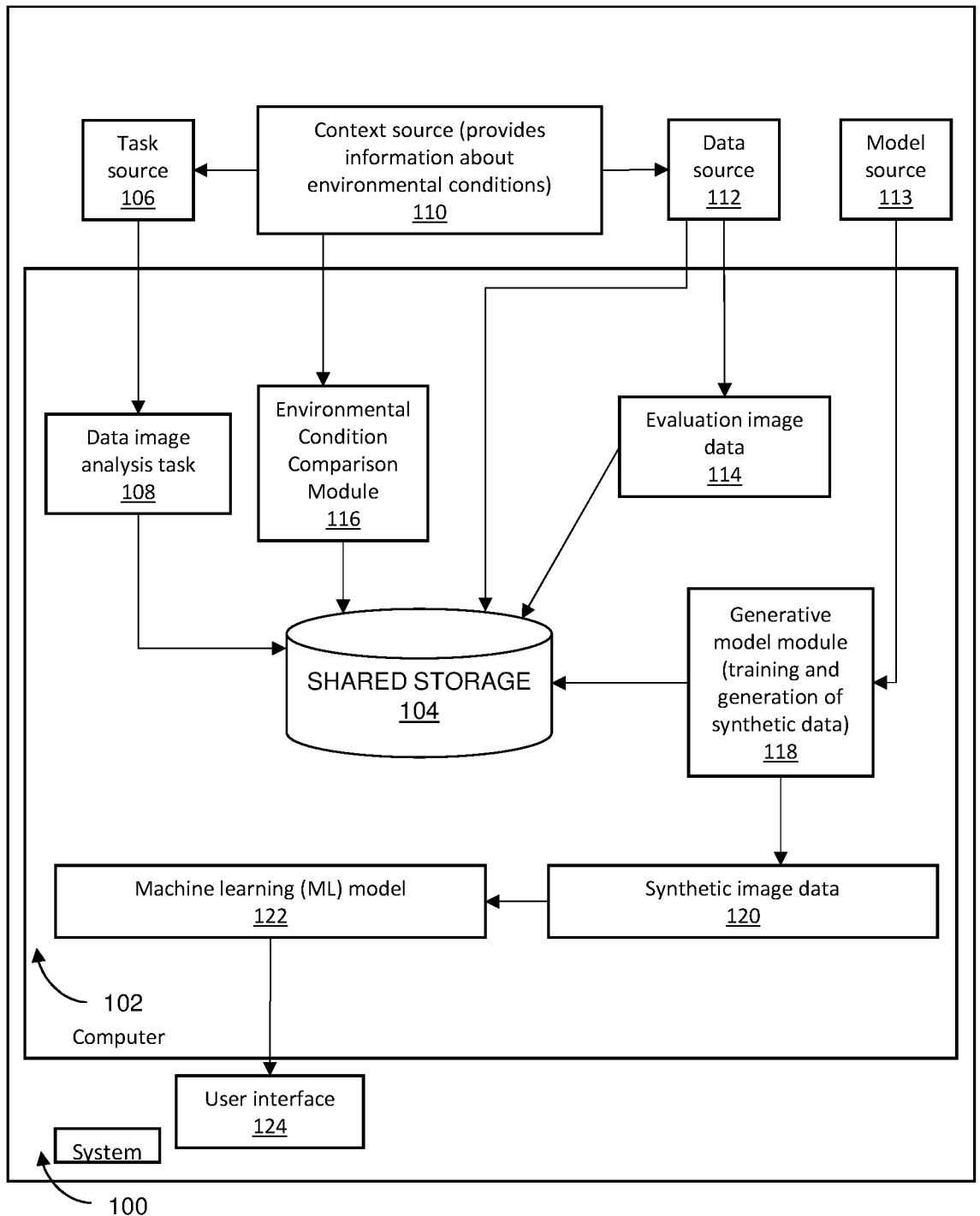
FIG. 1 is a schematic block diagram illustrating an overview of a system for computer-implemented usage of synthetic image data generated from recorded image data in a first context to complete a task in a second context according to embodiments of the present invention.
Figure 2:
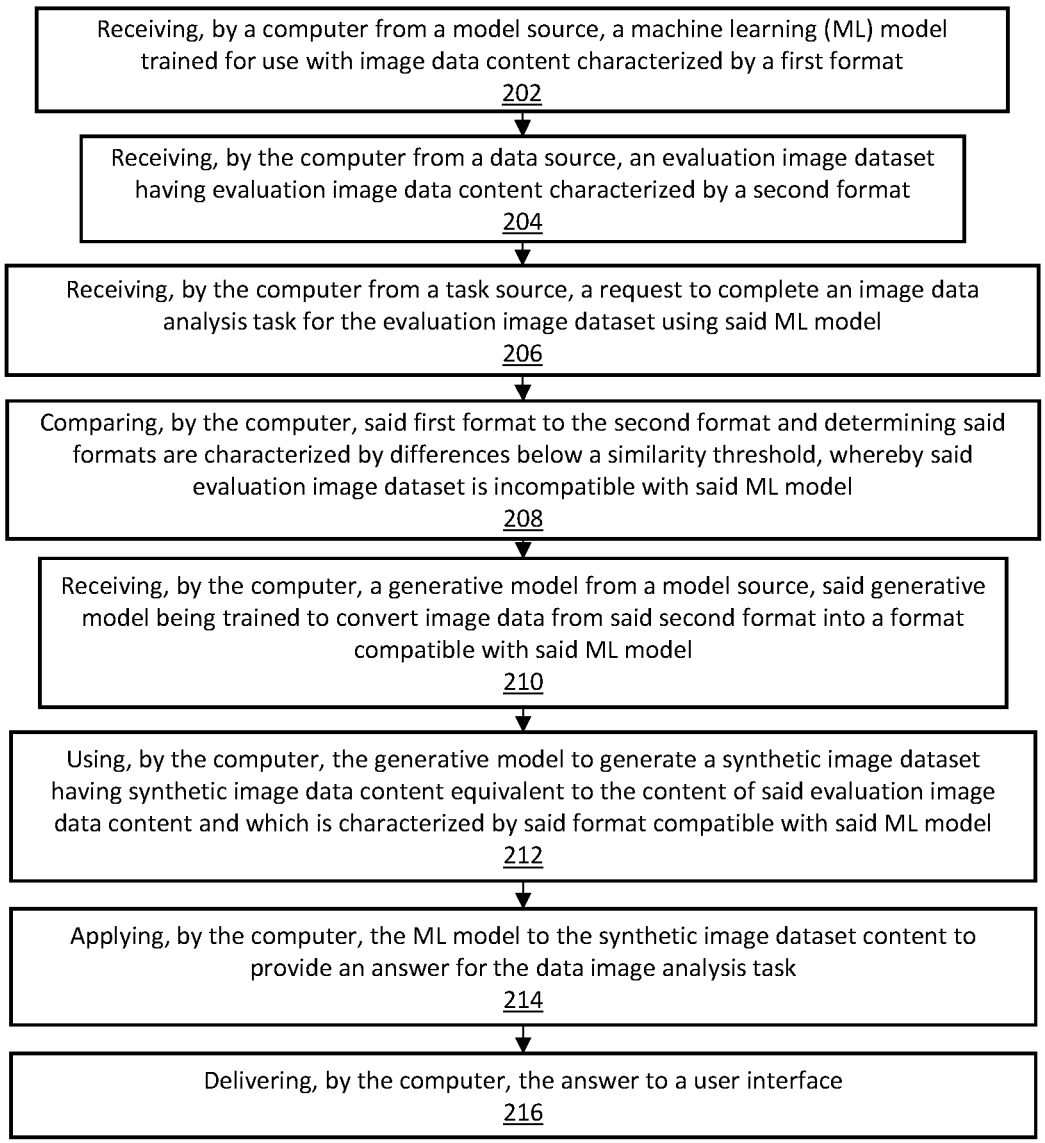
FIG. 2 is a flowchart illustrating a method, implemented using the system shown in FIG. 1, of optimizing audio input component operation during a teleconference according to aspects of the invention.

Now with combined reference to the Figures generally and with particular reference to FIG. 1 and FIG. 2, an overview of a method to complete a task in a first context using synthetic image data generated from image data recorded in a second context usable within a system 100 as carried out by a server computer 102 having optionally shared storage 104, according to an embodiment of the present disclosure is shown. The server computer 102 receives, from a task source 106, a data image analysis task 108 associated with a first context (set of environmental conditions relevant to task completion). The sever computer 102 receives environmental condition information from context source 110. According to aspects of the invention, the context source 110 may include a variety of external sources, and a weather forecasting or reporting services are particularly appropriate. A data source 112 sends to the server computer 102 evaluation image data 114 which, according to aspects of the invention, will be associated with a context that is independent of the context associated with data previously used to train existing ML models for optimal performance. According to aspects of the invention, the server computer 102 receives context information relevant to the evaluation image data 114, and this information can be provided from the data source 112 (e.g., as metadata accompanying the recorded image data) or from the context source 110. An Environmental Condition Comparison Module (ECCM) 116 receives information about data contexts (e.g., environmental conditions) related to the data used in relevant image processing tasks. According to aspects of the invention, the ECCM 116 determines a degree of similarity between the context associated with evaluation image data content and the context associated with data used to previously train available ML models and determines whether the contexts are similar enough to use previously trained model successfully. When the context associated with evaluation image data 114 is similar to the context associated with training data previously used to train an existing ML model, evaluation image data 114 may be used directly with relevant ML models to provide acceptable data analysis task output. According to aspects of the invention, when data contexts are dissimilar, (e.g., when the compared contexts fall below a similarity threshold), synthetic data is generated. In an embodiment, this synthetic data may be data generated from (and having equivalent content to) evaluation image data 114 (e.g., recorded data) with a suitable (ML-model-compatibly-similar) context and used as evaluation data for the existing ML model. According to another embodiment, the synthetic data may be training data (e.g., data annotated with training labels) also generated from (and having equivalent content to) evaluation data. The synthetic training data will be characterized by a context not modelled previously, and a relevant ML model is retrained using the synthetic training data.

The server computer 102 includes a generative model module that trains a generative model to produce synthetic image data 120 from the evaluation image data 114. The of synthetic image data 120 has content equivalent to the evaluation image data 114 and is passed to task solving Machine Learning (ML) model 122 for processing. Task output (e.g., data analysis task processing results) is provided to a user interface 124 (which can include a display, storage medium, and similar devices) selected by one skilled in this field.

Now with respect to FIG. 2, an overview of a method to complete a task in a first context using synthetic image data generated from image data recorded in a second context using the system shown in FIG. 1 will be described. The server computer 102 receives at block 202, from a model source, a machine learning (ML) model trained for use with image data content characterized by a first context (e.g., collected in a first scenario). At block 204, the server computer 102 receives from a data source, an evaluation image dataset having evaluation image data content characterized by a second context (e.g., collected in a second scenario). At block 206, the server computer 102 receives from task source 106, a request to complete an image data analysis task for the evaluation image dataset 114 using the ML model 122. At block 208, the server computer 102 compares the first context to the second context and determines whether the contexts are characterized by differences below a similarity threshold, and if so, that the evaluation image dataset 114 is incompatible with the ML model 122. At block 210, the server computer 102 receives a generative model from a model source; the generative model (see e.g., 306 in FIG. 3) is trained to convert image data content characterized by a second format (e.g., a format associated with the second context) into image data content characterized by a first format (e.g., a format associated with the first context), so that the converted image data content is in a format compatible with the ML model. At block 212, the server computer 102 uses the generative model 306 to generate a synthetic image dataset having synthetic image data content equivalent to the content of said evaluation image data content and which is characterized by the format compatible with the ML model 306. At block 214, the server computer 102 applies the ML model 306 to the synthetic image dataset content to provide an answer for the data image analysis task 108. At block 216, the server computer 102 delivers the data analysis task answer to user interface 124.

According to aspects of the invention, the environmental conditions include a variety of context establishing attributes, including temperature, ambient luminosity, relative humidity, contemporary rainfall quantity, time of day, cloud cover, soil moisture information, seed information, geographical region, and period of year, etc. Other suitable attributes may also be selected by one skilled in this field. According to aspects of the invention, the Environmental Condition Comparison Module 116 receives information from the context source 110 and compares attributes associated with the context of the evaluation image data 114 and training data used to train available ML models 112. Although the threshold value for similarity may vary according to the desired application, a preferred threshold is when all compared attribute values for the recorded training data and for the current task are within 10% of each other. The server computer 102, at block 206, responsive to a determination that the recorded image data context and current-task-relevant contexts do not meet the threshold of similarity, generates synthetic image data having characteristics associated with the first set of environmental conditions from said set of recorded image data associated with the second set of environmental conditions, using a generative model received from model source 113 and trained in the generative model module 118 to convert input image data associated with an input image data context into image output data associated with an output image data context. The server computer 102, at block 208 solves the data image analysis task using machine learning (ML) model 122 applied to the synthetic data 120. The server computer 102 provides task output 124 at block 208.

Figure 3:
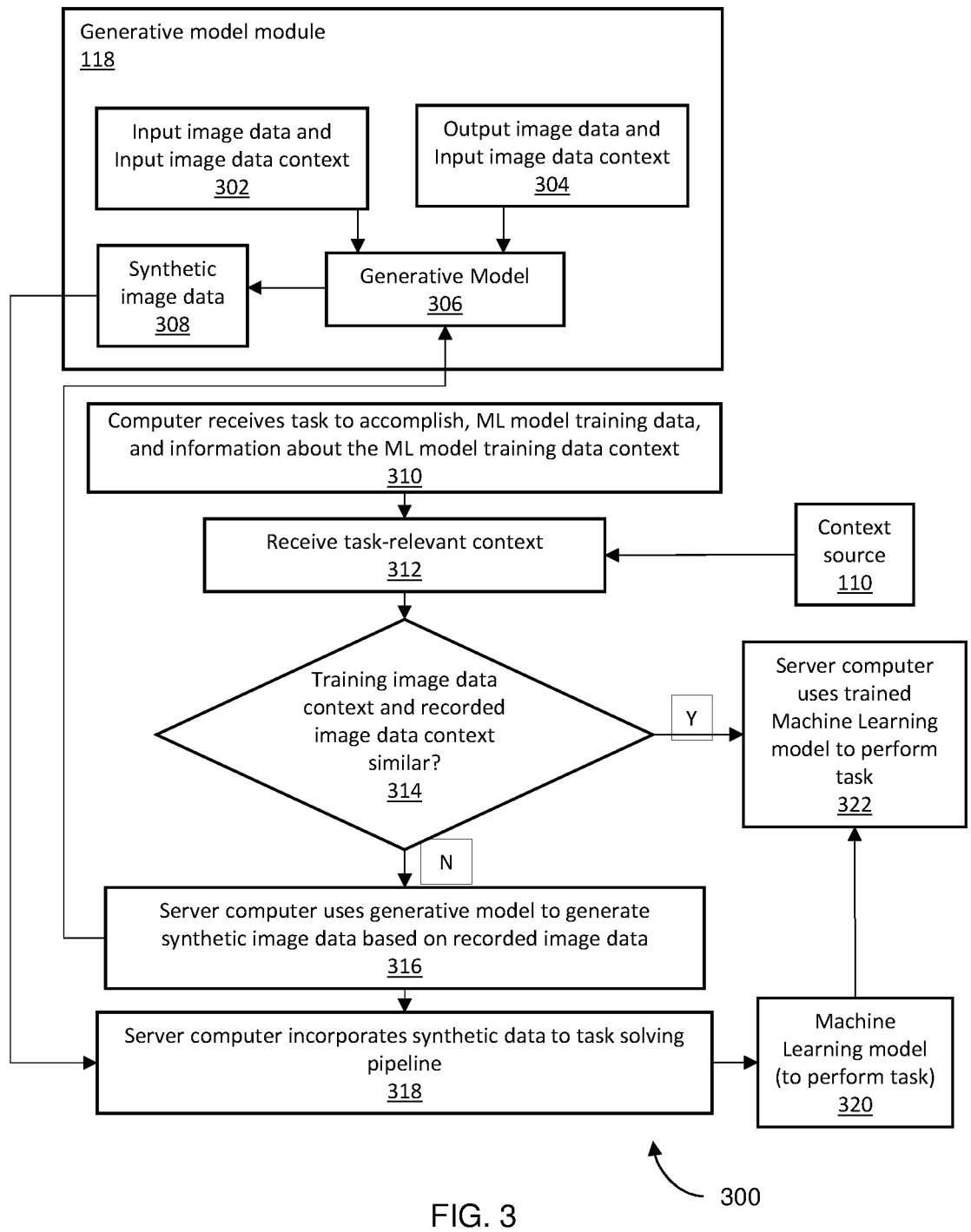
FIG. 3 is a flowchart illustrating an alternate depiction of aspects of the method described in FIG. 2.

Now with reference to FIG. 3, a flowchart 300 illustrating an alternate depiction of aspects of the method described in FIG. 2 will be described. Within generative model module 118, at block 302, the server computer 102 receives input image data and Input image data context. According to aspects of the invention, this is a dataset containing input data and information regarding a corresponding context. In one embodiment, the input data includes aerial images of a certain crop type, and the corresponding context may include one or more climate-related information (temperature, luminosity, acquisition time, and so on). The server computer 102 receives, at block 304, output image data and input image data context. According to aspects of the invention, this is a dataset containing output data with the corresponding context. The output data may have the same format as the input data, with different contextual information. The server computer 102, at block 306, generative 306 model that learns to translate the given input data and the two contexts into the output data. Model formats for the generative model 306 include, but are not limited, Generative Adversarial Network (GANs). The output of the generative model 306 includes consists synthetic data 308 at the newly introduced context.

The server computer 102, at block 310, receives a task to accomplish, training image data, and information about the training image data context. According to aspects of the invention, task to be performed (e.g., crop identification, tree counting) is received from task source 106 (or, alternatively, provided by a user).

At block 312, the server computer 102 receives context information for the evaluation image data. According to aspects of the invention, the evaluation image context is provided by an external context source 110 and may take any of several formats, including weather forecasting services, news material in any media form, soil moisture information, seed planting information, associated geographical regions, etc.

At block 314, the server computer 102, determines whether training image data context and recorded image data context are similar (e.g., do compared context values exceed a threshold of similarity). According to aspects of the invention, the server computer 102 verifies whether the current, task-relevant context is similar to the context when the evaluation image data 114 (e.g., training data) was acquired. Similarity metrics may include distances, correlations, differences between values and similar measurements selected by one skilled in this field.

If the server computer 102 determines that the compared contexts are not similar (have compared context attributes that fall below the similarity threshold), the server computer 102, at block 316, uses generative model 306 to create synthetic samples at the current context. Aspects of the invention include two arrangements: (1) the server computer 102 may either generate synthetic test samples at the known context (when the training data was acquired), or (2) the server computer may generate synthetic training samples at the new context (e.g., relevant to the current task).

At block 318, the server computer 102 incorporates the synthetic data 308 to a current task solving processing flow. According to aspects of the invention, the server computer 102 executes, at block 320 and 322, the selected trained task-solving model for the target context with the new, synthetic samples. If synthetic test samples are generated (setup #1), the system uses the task-solving model previously trained at the known context. If synthetic training samples are generated (setup #2), the system retrains the task-solving model with samples at the new context. According to aspects of the invention, the Machine Learning (ML) model may be any type of data-driven model (e.g., for example, a neural network) that can be trained and which allows solving tasks related to classification, segmentation, regression, etc. According to aspects of the invention, the server computer 102, the server computer 102 uses, at block 322, the previously trained model (setup #1) or the re-trained model (setup #2) to perform the current task. According to aspects of the invention, if the ECCM 116 determines that the compared contexts exceed the similarity threshold, there is no need to generate synthetic image data 308.

Figure 4:
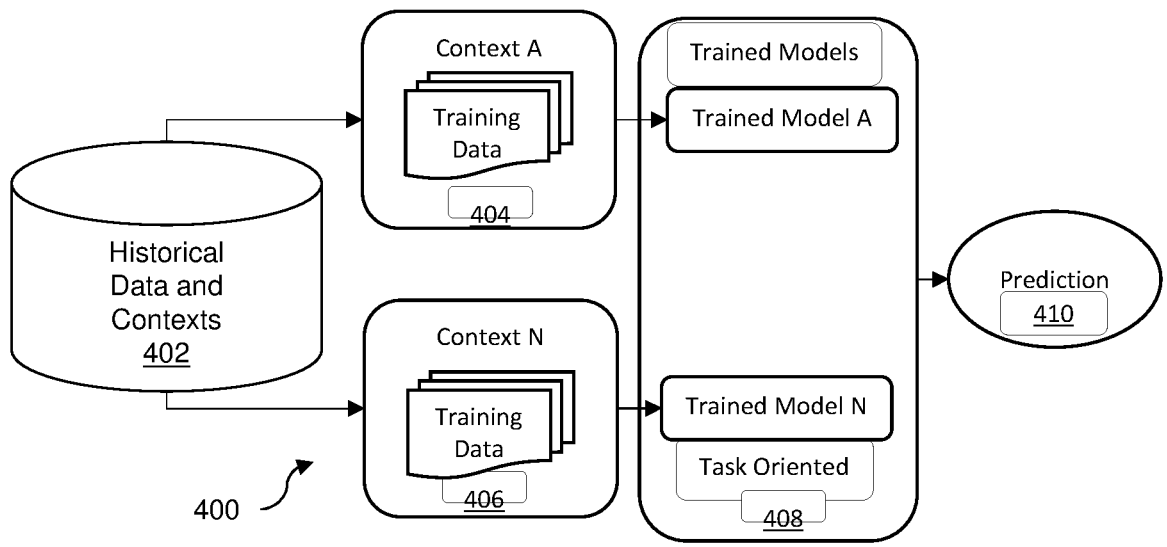
FIG. 4 is a schematic representation of aspects of the system shown in FIG. 1, in use to provide a data-driven prediction, according to an embodiment of the present invention.

Now with reference to FIG. 4, a schematic representation 400 of aspects of the system shown in FIG. 1, in use to provide a data-driven prediction when training data contexts and task context match, will be described. In block 402, historical data and contexts are passed along to blocks 404 and 406, in which training data for Context A and Context B, respectively, are available for use to train associated models in block 408. These models are useful for solving tasks having contexts that match a context associated with one of sets of model training data. In block 410, output from a model that matches the current task is provided a task answer prediction. In the arrangement shown in FIG. 4, annotated data and their corresponding contexts, are used to generate trained models, each optimized for a specific dataset and task.

Aspects of the present invention are especially well suited to address scenarios where annotation is not available or where new contexts arise. In these scenarios, trained models for specific tasks, are available in some contexts, but not for other contexts. Aspects of the present invention can translate data between contexts by adapting the domain, thereby enabling the use available trained models.

Figure 5:
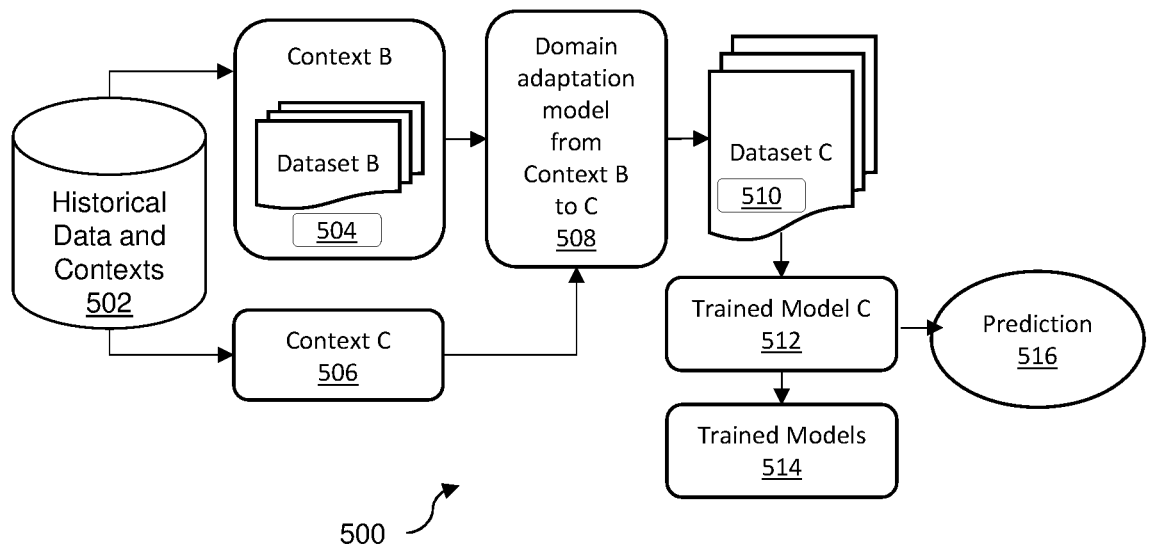
FIG. 5 is a schematic representation of aspects of the system shown in FIG. 1, in use to provide a data-driven prediction, according to an embodiment of the present invention.

With reference to FIG. 5, a schematic representation 500 of aspects of the system shown in FIG. 1, in use to provide a data-driven prediction, according to an embodiment of the present invention will be discussed. Historical data and associated contexts are passed from block 502 for further processing. In particular, the server computer 102, at blocks 504 and 506 collectively, receives input and output data and two contexts: one with respect to the input data and the other with respect to the output data. A domain adaptation model translates data from Context B to Context C (e.g., output for block 510). In the training phase, the system learns to translate a given input data and the two contexts into output data. In this sense, a trained model could be either expert in translating data between two different specific contexts or could be a more robust model that learns to switch data appearance depending on the contexts (e.g., block 512, 514). In the data translation scenario, the server computer 102 benefits from trained models with annotation available to classify, predict, or segment newly acquired data. The server computer 102 synthesizes new data to known contexts, where existing trained models are available. In this configuration, the server compute 102 maps new data acquired in new contexts to known contexts and benefits from existing trained models already available. The server computer generates task prediction output in block 516. Using historical and new data, regardless of annotation, the system can train domain adaptation models that learn to map data from one context into another. This allows the server computer 102 to switch data to a context where annotated data, and therefore trained models, are available and perform predictions.

Figure 6:
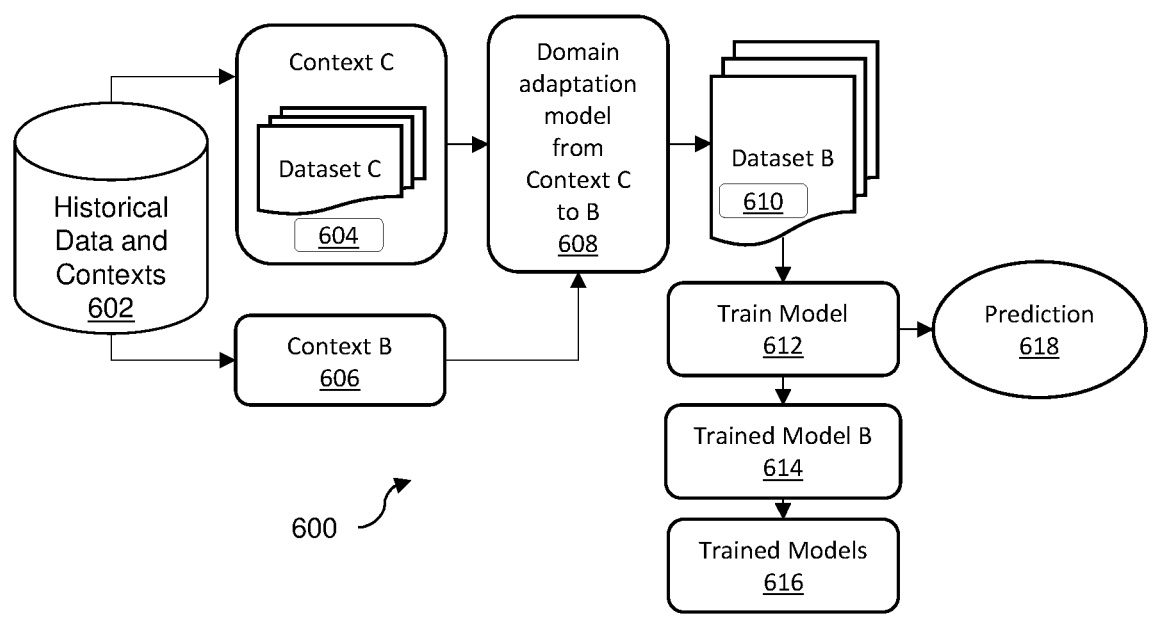
FIG. 6 is a schematic representation of aspects of the system shown in FIG. 1, in use to provide a data-driven prediction, according to an embodiment of the present invention.

Now with reference to FIG. 6, a schematic representation 600 of aspects of the system shown in FIG. 1, in use to provide a data-driven prediction, according to an embodiment of the present invention will now be discussed. Using historical and new data (from block 602), regardless of annotation, the system would be able to train domain adaptation models that learn to map data from a context into another. This allows the server computer 102 to switch training data to new contexts (e.g., 604 and 606 into block 610 via block 608) and train (via block 612) new models (614, 616) to be available for testing and perform prediction in block 618. In this arrangement, the server computer system maps known data to new data with new contexts and trains new task-oriented models. In this embodiment, the server computer 102 uses domain adaptation models (block 608) to synthesize new data for a given new context, which have been previously trained using historical data from multiple contexts. In such configuration, the server computer 102 can generate new task-oriented trained models to perform well in different new contexts.

Figure 7:
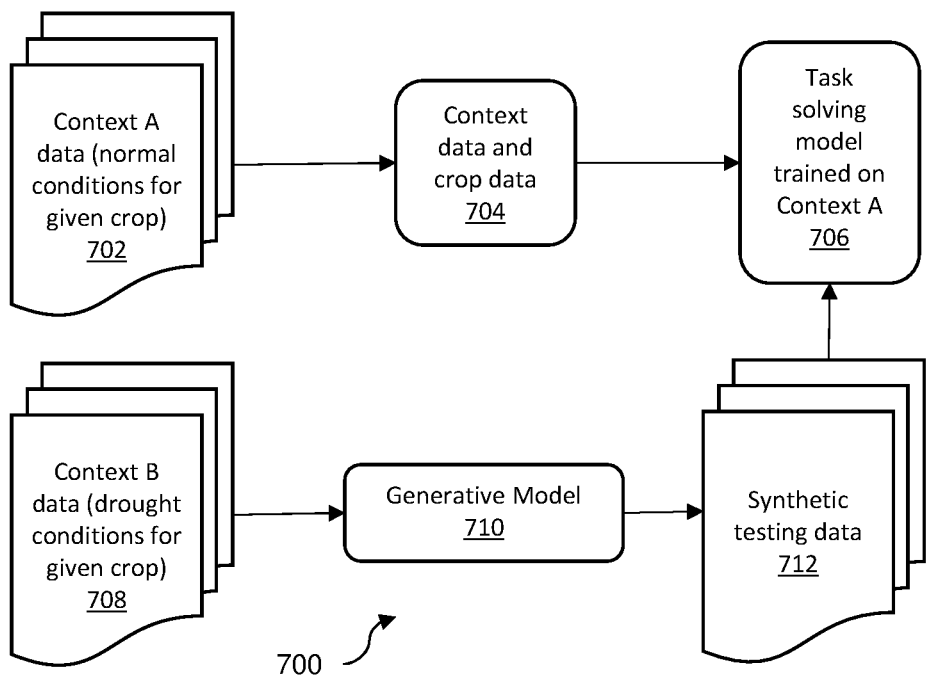
FIG. 7 is a schematic representation of aspects of the system shown in FIG. 1, with a previously-trained model applied to synthetic data, according to an embodiment of the present invention.

Now with reference to FIG. 7, a schematic representation 700 of aspects of the system shown in FIG. 1, with a previously-trained model applied to synthetic data, according to an embodiment of the present invention will be discussed. In this embodiment, a task solving model is trained on context A data (historical training data from in block 702 and current context A and crop data from 706 are passed along for use by model in context A in block 706)). Evaluation (or testing) data related to context B is gathered in block 708. The server computer 102 uses a trained GAN (block 710) to generate synthetic samples (block 721) associated with context A; this synthetic data is use with the model trained on context A (in block 706).

Figure 8:
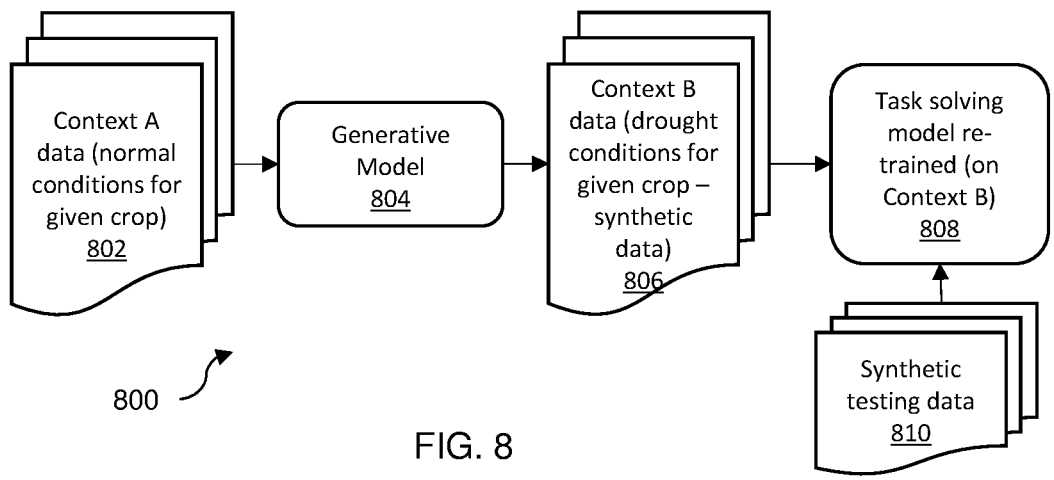
FIG. 8 is a schematic representation of aspects of the system shown in FIG. 1, training a previously-trained model with newly-generated synthetic data, according to an embodiment of the present invention.

Now with reference to FIG. 8, a schematic representation 800 of aspects of the system shown in FIG. 1, training a previously-trained model with newly-generated synthetic data, according to an embodiment of the present invention will be discussed. At block 802, the server computer system passes context A data to a trained GAN (block 804) to generate synthetic samples (block 806, 810) relevant for context B and then retrain the task solving model (block 808) trained in context B data.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
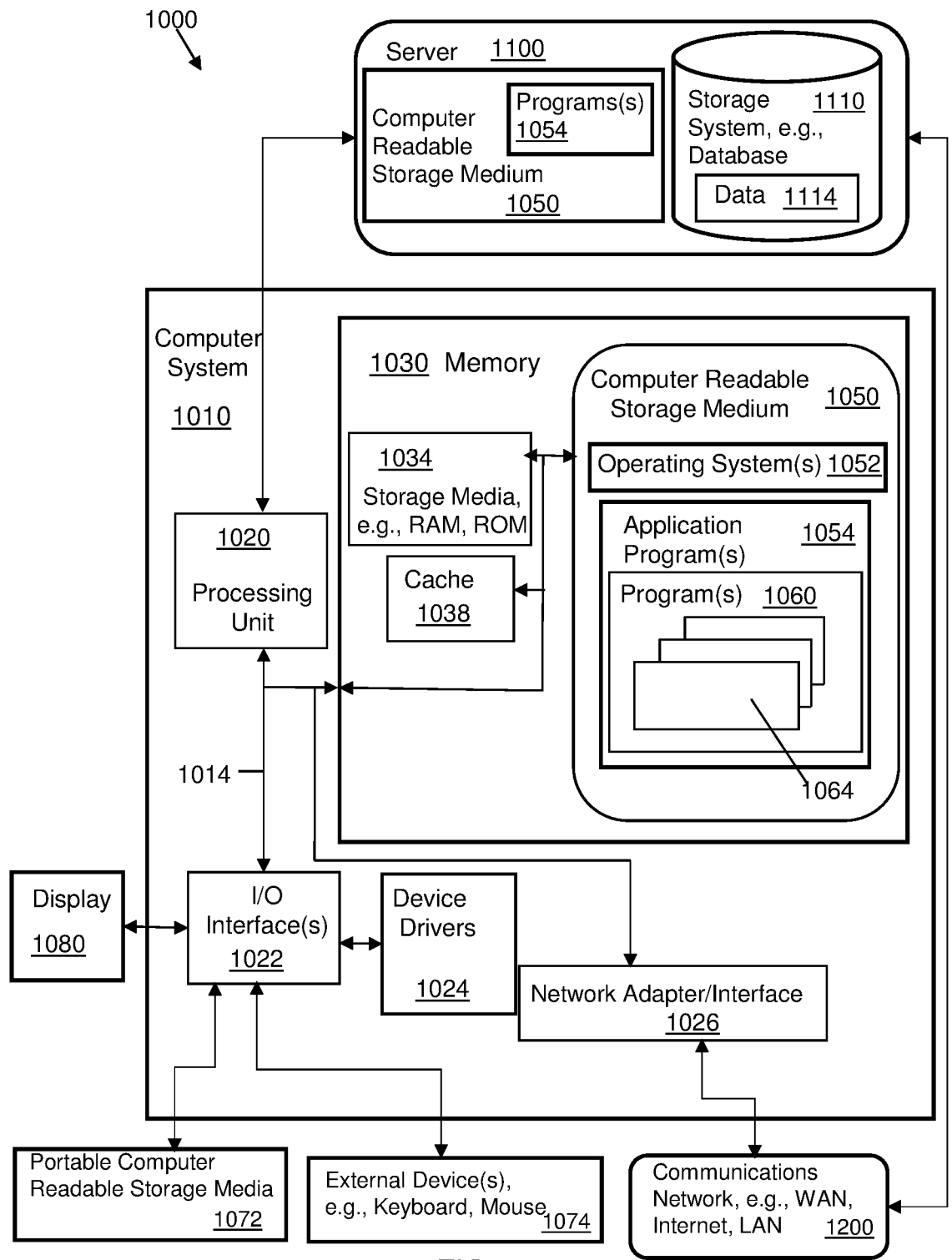
FIG. 9 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 9, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
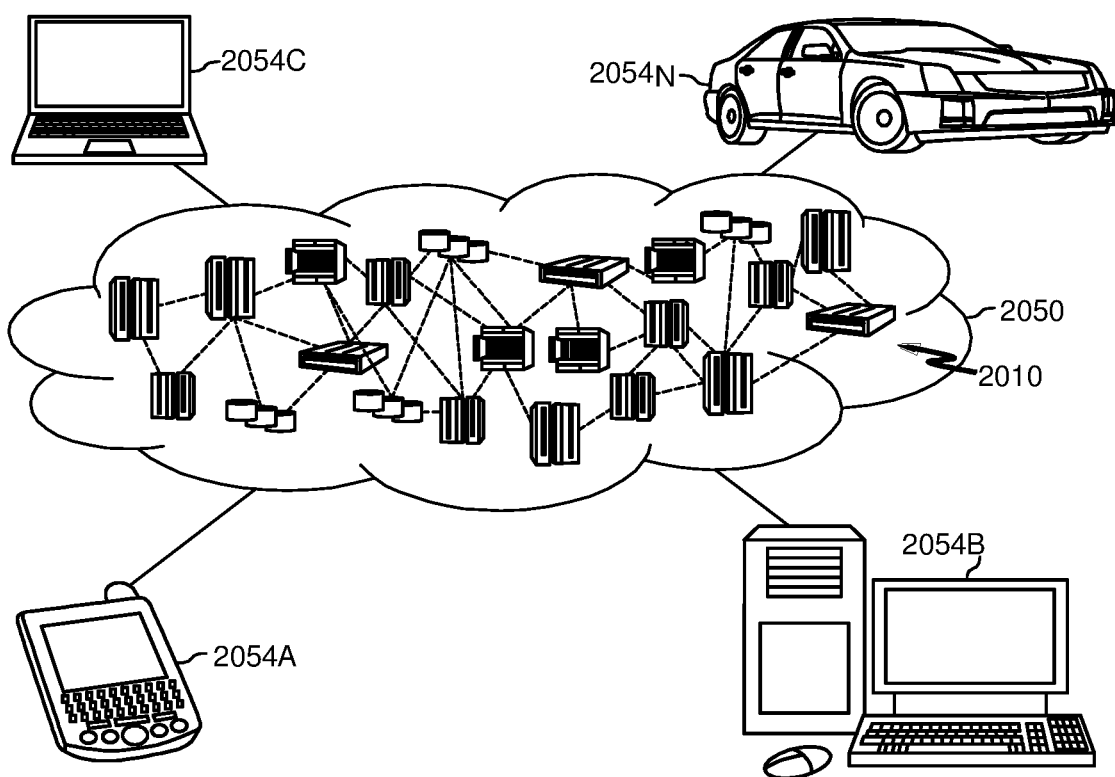
FIG. 10 depicts a cloud computing environment according to an embodiment of the present invention.

Referring now to FIG. 10, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 10 are intended to be illustrative only and that computing nodes 2010 and cloud computing environment 2050 can communicate with any type of computerized device over any type of network and/or network addressable connection (e.g., using a web browser).

Figure 11:
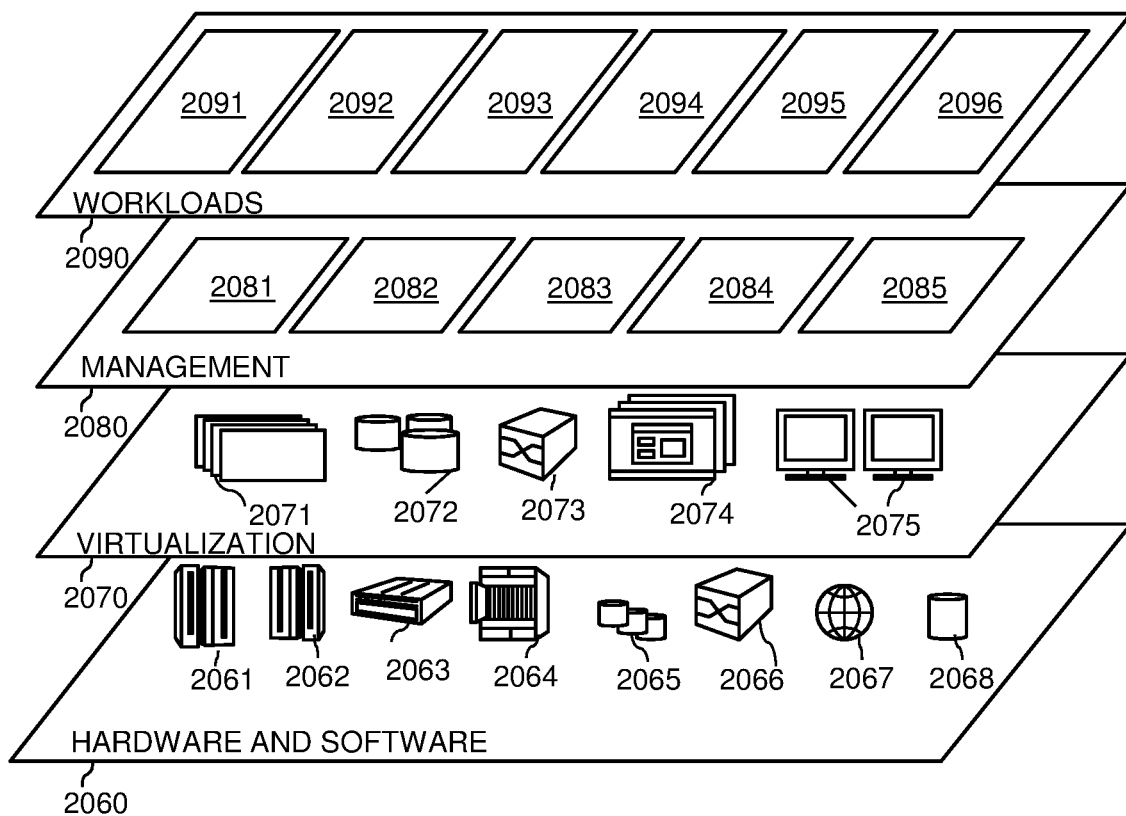
FIG. 11 depicts abstraction model layers according to an embodiment of the present invention.

Referring now to FIG. 11, a set of functional abstraction layers provided by cloud computing environment 2050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized.

Examples of workloads and functions which may be provided from this layer include: mapping and navigation 2091; software development and lifecycle management 2092; virtual classroom education delivery 2093; data analytics processing 2094; transaction processing 2095; and completing a task in a first context using synthetic image data generated from image data recorded in a second context 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to complete a data image analysis task, comprising:
    receiving, by a computer from a model source, a machine learning (ML) model trained for use with image data content characterized by a first format associated with a first context;
    receiving, by said computer from a data source, an evaluation image dataset having evaluation image data content characterized by a second format associated with a second context;
    receiving, by said computer from a task source, a request to complete an image data analysis task for the evaluation image dataset using said ML model;
    comparing, by said computer, said first context to said second context and determining said contexts are characterized by differences that fall below a similarity threshold, whereby said evaluation image dataset is incompatible with said ML model;
    receiving, by said computer, a generative model from a model source, said generative model being trained to convert image data from said second format into a format compatible with said ML model;
    using, by said computer, the generative model to generate a synthetic image dataset having synthetic image data content equivalent to the content of said evaluation image data content and which is characterized by said format compatible with said ML model;
    applying, by said computer, the ML model to the synthetic image dataset content to provide an answer for the data image analysis task; and
    delivering, by said computer, the answer to a user interface.

2. The method of claim 1, wherein said synthetic dataset is annotated with model training labels; and wherein said computer, responsive to generating said synthetic dataset, trains said ML model on said synthetic dataset.

3. The method of claim 1, wherein said generative model is a domain adaption model selected from list of model types consisting of adversarial-based domain adaptation models, divergence-based domain adaptation models, and reconstruction-based domain adaptation models.

4. The method of claim 1, wherein said formats are characterized, at least in part by attributes selected from a list consisting of temperature, ambient luminosity, relative humidity, contemporary rainfall quantity, time of day, cloud cover, soil moisture information, seed information, geographical region, and period of year.

5. The method of claim 1, wherein said data image analysis task is selected from a list consisting of crop identification, crop counting, crop quality assessment, and crop yield output estimation.

6. The method of claim 1, wherein said machine learning (ML) model is trained to solve data image analysis tasks selected from a list consisting of data content classification, data content segmentation, and data content regression.

7. The method of claim 1, further comprising:
    receiving, by said computer from said data source, input image data associated with said second context, an indication of context attributes characterizing said second format, and an identification of context attributes characterizing the format compatible with said ML model, wherein the generative model is trained to convert image data content characterized by said second format into equivalent image data characterized by the format compatible with said ML model, using said input image data and said indications of said format attributes.

8. A system to complete a data image analysis task, which comprises:
    a computer system comprising a computer readable storage medium having program instructions embodied therewith, the program instructions executable by a computer to cause the computer to:
    receive, from a model source, a machine learning (ML) model trained for use with image data content characterized by a first format;
    receive, from a data source, an evaluation image dataset having evaluation image data content characterized by a second format;
    receive, from a task source, a request to complete an image data analysis task for the evaluation image dataset using said ML model;
    compare, by said computer, said first format to said second format and determining said formats are characterized by differences that fall below a similarity threshold, whereby said evaluation image dataset is incompatible with said ML model;
    receive a generative model from a model source, said generative model being trained to convert image data from said second format into a format compatible with said ML model;
    use the generative model to generate a synthetic image dataset having synthetic image data content equivalent to the content of said evaluation image data content and which is characterized by said format compatible with said ML model;
    apply the ML model to the synthetic image dataset content to provide an answer for the data image analysis task; and
    deliver the answer to a user interface.

9. The system of claim 8, wherein said synthetic dataset is annotated with model training labels; and wherein said instructions further cause the computer to, responsive to generating said synthetic dataset, train said ML model on said synthetic dataset.

10. The system of claim 8, wherein said generative model is a domain adaption model selected from list of model types consisting of adversarial-based domain adaptation models, divergence-based domain adaptation models, and reconstruction-based domain adaptation models.

11. The system of claim 8, wherein said formats are characterized, at least in part by attributes selected from a list consisting of temperature, ambient luminosity, relative humidity, contemporary rainfall quantity, time of day, cloud cover, soil moisture information, seed information, geographical region, and period of year.

12. The system of claim 8, wherein said data image analysis task is selected from a list consisting of crop identification, crop counting, crop quality assessment, and crop yield output estimation.

13. The system of claim 8, wherein said machine learning (ML) model is trained to solve data image analysis tasks selected from a list consisting of data content classification, data content segmentation, and data content regression.

14. The system of claim 8, further including instructions causing said computer to:
receive from said data source, input image data associated with said second format, an indication of format attributes characterizing said second format, and an identification of format attributes characterizing the format compatible with said ML model; wherein the generative model is trained to convert image data content characterized by said second format into equivalent image data characterized by the format compatible with said ML model, using said input image data and said indications of said format attributes.

15. A computer program product to complete a task, the computer program product comprising a computer readable storage medium having program instructions embodied therewith, the program instructions executable by a computer to cause the computer to:
receive, using the computer, from a model source, a machine learning (ML) model trained for use with image data content characterized by a first format;
receive, using the computer, from a data source, an evaluation image dataset having evaluation image data content characterized by a second format;
receive, using the computer, from a task source, a request to complete an image data analysis task for the evaluation image dataset using said ML model;
compare, using the computer, by said computer, said first format to said second format and determining said formats are characterized by differences that fall below a similarity threshold, whereby said evaluation image dataset is incompatible with said ML model;
receive, using the computer, a generative model from a model source, said generative model being trained to convert image data from said second format into a format compatible with said ML model;
use, by the computer, the generative model to generate a synthetic image dataset having synthetic image data content equivalent to the content of said evaluation image data content and which is characterized by said format compatible with said ML model;
apply, using the computer, the ML model to the synthetic image dataset content to provide an answer for the data image analysis task; and
deliver, using the computer, the answer to a user interface.

16. The computer program product of claim 15, wherein said synthetic dataset is annotated with model training labels; and wherein said instructions further cause the computer to, responsive to generating said synthetic dataset, train said ML model on said synthetic dataset.

17. The computer program product of claim 15, wherein said generative model is a domain adaption model selected from list of model types consisting of adversarial-based domain adaptation models, divergence-based domain adaptation models, and reconstruction-based domain adaptation models.

18. The computer program product of claim 15, wherein said formats are characterized, at least in part by attributes selected from a list consisting of temperature, ambient luminosity, relative humidity, contemporary rainfall quantity, time of day, cloud cover, soil moisture information, seed information, geographical region, and period of year.

19. The computer program product of claim 15, wherein said machine learning (ML) model is trained to solve data image analysis tasks selected from a list consisting of data content classification, data content segmentation, and data content regression.

20. The computer program product of claim 15, further including instructions causing said computer to:
receive, using the computer, from said data source, input image data associated with said second format, an indication of format attributes characterizing said second format, and an identification of format attributes characterizing the format compatible with said ML model, wherein the generative model is trained to convert image data content characterized by said second format into equivalent image data characterized by the format compatible with said ML model, using said input image data and said indications of said format attributes.

\* \* \* \* \*